(12) United States Patent
Remon

(10) Patent No.: US 6,537,447 B2
(45) Date of Patent: *Mar. 25, 2003

(54) SEWER BASKET AND ITS SUPPORT

(76) Inventor: Gilles Remon, 196 Léger, Châteauguay, QBC (CA), J6J 1L1

(*) Notice: Subject to any disclaimer, the term of this patent is extended or adjusted under 35 U.S.C. 154(b) by 0 days.

This patent is subject to a terminal disclaimer.

(21) Appl. No.: 09/852,319

(22) Filed: May 11, 2001

(65) Prior Publication Data

US 2001/0030150 A1 Oct. 18, 2001

Related U.S. Application Data

(63) Continuation-in-part of application No. 09/482,947, filed on Jan. 14, 2000, now Pat. No. 6,254,770.

(51) Int. Cl.[7] ............................. B01D 35/02; E03F 5/06
(52) U.S. Cl. ................. 210/163; 210/164; 210/238; 210/323.1; 210/451; 210/470; 210/480; 404/4
(58) Field of Search ................. 210/163, 164, 210/232, 238, 323.1, 447, 451, 452, 470, 471, 474, 477, 479, 480; 404/4, 5

(56) References Cited

U.S. PATENT DOCUMENTS

| | | | | |
|---|---|---|---|---|
| 122,209 A | | 12/1871 | Ashman et al. | |
| 530,816 A | * | 12/1894 | Wright | 210/164 |
| 739,249 A | * | 9/1903 | Woods | 210/451 |
| 815,874 A | * | 3/1906 | Stransky | 210/480 |
| 1,003,398 A | * | 9/1911 | Britzius | 210/479 |
| 1,312,041 A | * | 8/1919 | Morison | 210/323.1 |
| 1,548,509 A | * | 8/1925 | Campbell | 210/480 |
| 2,615,526 A | | 10/1952 | Lane | |
| 3,674,149 A | * | 7/1972 | Donulson | 210/163 |
| 4,097,171 A | * | 6/1978 | Fier | 210/163 |
| 4,152,801 A | * | 5/1979 | Lieber | 210/470 |
| 4,198,717 A | | 4/1980 | Kessel | |
| 4,246,998 A | * | 1/1981 | O'Ffill | 210/323.1 |
| 4,419,232 A | | 12/1983 | Arntyr et al. | |
| 5,072,538 A | * | 12/1991 | Hendricks et al. | 210/470 |
| 5,232,587 A | | 8/1993 | Hegemier et al. | |
| 5,252,211 A | * | 10/1993 | Searfoss, Jr. | 210/474 |
| 5,372,714 A | | 12/1994 | Logue, Jr. | |
| 5,405,539 A | * | 4/1995 | Schneider | 210/163 |
| 5,643,445 A | | 7/1997 | Billias et al. | |
| 5,733,445 A | | 3/1998 | Fanelli | |
| 5,772,713 A | * | 6/1998 | Salinas et al. | 210/480 |
| 5,888,392 A | * | 3/1999 | Frizell | 210/474 |
| 5,904,842 A | | 5/1999 | Billias et al. | |

* cited by examiner

*Primary Examiner*—Christopher Upton

(57) ABSTRACT

A sewer basket and its support are to be positioned at any selected level within a vertical sewer pipe having an interior surface and an opening, of reduced size or not, at street level. The basket support is secured to the interior surface of the sewer pipe to receive the basket that includes a plurality of filter units adjacently and releasably resting on the basket support. Each filter unit is so sized as to get through the sewer opening while being in a substantially horizontal orientation. Each filter unit includes a frame, a filter screen secured to and extending across the frame, and a handle device accessible from the pipe opening to properly position, place and retrieve the unit on and from the basket support respectively. The basket support includes an intermediate support having a generally flat lattice shape that abuttingly rests thereon and that abuttingly supports the filter units.

20 Claims, 8 Drawing Sheets

SEWER BASKET AND ITS SUPPORT

CROSS-REFERENCE TO RELATED APPLICATION

This application is a Continuation-In-Part (C.I.P.) of patent application Ser. No. 09/482,947, filed on Jan. 14, 2000 now U.S. Pat. No. 6,254,770.

FIELD OF THE INVENTION

The present invention relates to sewer baskets that are removably mounted within a vertical sewer opening at street level, commonly known as storm sewers and more precisely to the storm sewers having a variable cross-sectional interior surface or a grand cross-sectional interior dimension.

BACKGROUND OF THE INVENTION

These sewer baskets are used to filter coarse material such as branches, leaves, gravel and the like so as to prevent clogging of the sewer network. The sewer baskets are removed and cleaned from time to time and make sewage more easy to filter at the filtration station to which the sewer network is connected. The baskets are usually supported within the vertical sewer pipe at about three feet below street level and are removably supported by devices that are difficult to install or which require modification of the surface of the sewer pipe. For instance angle irons can be permanently secured to the sewer surface by screws driven into the sewer wall or as described in U.S. Pat. No. 530,816 to Wright entitled "Manhole for sewers" and dated Dec. 11, 1894, a metal sleeve has to be inserted into the manhole with an inturned rim at its lower end on which the frame of the sewer basket is releasably supported. Another example of a support system for a sewer basket is found in U.S. Pat. No. 122,209 dated Dec. 26, 1871 entitled "Improvement in sewer traps and catch basins" to Ashman et al. In this patent the sewer wall is modified at the desired level to provide a ledge all around the sewer pipe on which the sewer basket releasably rests.

Furthermore, the manhole is sometimes smaller than the diameter of the pipe itself. In such circumstances, the basket cannot easily come out through the manhole while remaining in horizontal orientation while keeping the garbage material inside the same.

OBJECTS OF THE INVENTION

It is therefore a general object of the present invention to provide a sewer basket with its support that obviates the above-noted disadvantages.

A further object of the present invention is to provide a sewer basket with its support that can be releasably secured to the sewer wall at any adjustable level and without in any way modifying the structure of the sewer interior surface.

Another object of the present invention is to provide a sewer basket with its support that can be shaped to fit sewers of various cross-sectional shapes.

Still another object of the present invention is to provide a sewer basket with its support of a simple, inexpensive and yet long-lasting construction.

A further object of the present invention is to provide a sewer basket with its support which can be easily fitted to the sewer wall at an adjustable level and using standard tools and within a minimum of time.

Still a further object of the present invention is to provide a sewer basket with its support that can be used for the storm sewers having a large cross-sectional interior dimension.

Yet another object of the present invention is to provide a sewer basket with its support that can be used in vertical sewers having an opening of a small size relative to the cross-section of the sewer pipe.

Other objects and advantages of the present invention will become apparent from a careful reading of the detailed description provided herein, with appropriate reference to the accompanying drawings.

SUMMARY OF THE INVENTION

According to an aspect of the present invention, there is provided a sewer filtering arrangement for preventing solids of a predetermined size from falling into a generally vertical sewer channel while allowing liquids to flow therein, the sewer channel defining a channel aperture leading into the sewer channel and a channel peripheral wall delimiting a peripheral surface of the sewer channel, the filtering arrangement being positionable at a predetermined level across the sewer channel, the filtering arrangement comprises:

at least two filtering components, each of the filtering components having at least one filtering aperture extending therethrough for allowing the liquids to flow therethrough while preventing through passage of the solids of a predetermined size, the filtering components being positionable in a filtering configuration wherein they lie in a generally adjacent relationship to each other to form a filtering structure extending at least partially across a portion of the sewer channel;

at least two supporting components, each of the supporting components allowing the flow of the liquids therethrough, the supporting components being positionable in a supporting configuration wherein they lie in a generally adjacent relationship to each other to form a supporting structure for supporting the filtering components in the filtering configuration;

an anchoring structure for anchoring the filtering arrangement to the peripheral wall, the anchoring structure including an anchoring section for anchoring the anchoring structure within the sewer channel at the predetermined level, the anchoring structure also including an abutting section for abuttingly supporting the supporting components in the supporting configuration.

Preferably, the anchoring structure defines an engagement surface for frictionally engaging the channel peripheral wall, the anchoring structure including a biasing component for selectively biasing the engagement surface in frictional engagement with the channel peripheral wall.

Preferably, the anchoring structure has a generally annular configuration defining an annulus outer surface and an annulus inner surface, the annulus outer surface being intended to frictionally contact the channel peripheral wall; the annulus inner surface being provided with at least one abutment tongue extending therefrom for abuttingly supporting the supporting components.

Typically, the anchoring structure includes at least two abutment tongues extending in a generally diametrically opposed relationship relative to each other from the annulus inner surface.

Preferably, the anchoring structure is formed out of a generally annular shaped supporting strip defining an interrupted generally annular configuration, the supporting strip supporting a pair of generally opposed strip ends, the strip ends being position in a generally facing relationship relative to each other, the supporting structure being provided with a size adjustment component for allowing customization of the size of the diameter of the interrupted annular configuration formed by the supporting strip, the size adjustment component forming the biasing component.

Preferably, the supporting strip is provided with a generally radially and inwardly projecting attachment tongue extending from each strip ends; the attachment tongues being mechanically coupled together by the size adjustment component to allow customization of the spacing between the attachment tongues.

Preferably, the size adjustment component is a threaded bolt and nut arrangement, the threaded bolt extending through corresponding apertures formed in both the attachment tongues.

Preferably, the abutment tongues define an abutment tongue radial spacing therebetween, the size adjustment component maintaining the abutment tongue radial spacing below a predetermined value so as to ensure that the abutment tongues provide sufficient support for supporting the supporting components in the supporting configuration.

Preferably, each of the supporting components includes a supporting component peripheral rim and a supporting component crossbar extending at least partially across the supporting component rim for at least partially supporting a corresponding filtering component, the supporting component rims being configured and sized for abuttingly resting on the abutting section of the anchoring structure.

Preferably, each of the supporting components has a generally hemi-disc configuration defining a rim arcuate segment extending integrally into a rim rectilinear segment, the rim rectilinear segment of each of the supporting components being positionable in an adjacent relationship relative to each other so that the supporting components together define a generally disc-shaped configuration.

Preferably, the supporting structure further includes a linking plate extending from one of the supporting components, the linking plate being configured and sized for abuttingly contacting the other one of the supporting components when the supporting components are in the supporting configuration for stabilizing the supporting structure formed by the supporting components.

Preferably, the filtering components are configured and sized so as to form a filtering structure extending within the sewer channel generally thereacross.

Preferably, at least one of the filtering components includes a filtering plate provided with a plurality of filtering apertures extend therethrough.

Preferably, the filtering plate is provided with a plate rim extending at least partially therefrom.

Preferably, at least two adjacent filtering plates are provided with corresponding plate rims and wherein the corresponding plate rims are positonable in abutting contact with each other.

Preferably, at least one of the filtering components is provided with a handle extending therefrom.

Preferably, the handle is provided with a length adjustment component for allowing adjustment of the length of the handle relative to the filtering component.

According to another aspect of the present invention, there is provided in combination, a sewer channel with a sewer filtering arrangement for preventing solids of a predetermined size from falling into the sewer channel while allowing liquids to flow therein, the sewer channel having a generally vertical orientation and defining a channel aperture leading into the sewer channel and a channel peripheral wall delimiting a peripheral surface of the sewer channel, the filtering arrangement being positionable at a predetermined level across the sewer channel, the filtering arrangement comprises:

at least two filtering components, each of the filtering components having at least one filtering aperture extending therethrough for allowing the liquids to flow therethrough while preventing through passage of the solids of a predetermined size, the filtering components being positionable in a filtering configuration wherein they lie in a generally adjacent relationship to each other to form a filtering structure extending at least partially across a portion of the sewer channel;

at least two supporting components, each of the supporting components allowing the flow of the liquids therethrough, the supporting components being positionable in a supporting configuration wherein they lie in a generally adjacent relationship to each other to form a supporting structure for supporting the filtering components in the filtering configuration;

an anchoring structure for anchoring the filtering arrangement to the peripheral wall, the anchoring structure including an anchoring section for anchoring the anchoring structure within the sewer channel at the predetermined level, the anchoring structure also including an abutting section for abuttingly supporting the supporting components in the supporting configuration.

Preferably, the channel aperture is smaller than a cross-section of the sewer channel at the predetermined level, each of the filtering components, supporting components and anchoring structure is configured and sized for insertion through the channel aperture when in an unassembled configuration while allowing extension across the sewer channel when in an assembled configuration.

The present invention alternatively provides for a combination of a sewer basket with a basket support for retaining the sewer basket at a selected level within a generally vertical sewer channel, the sewer channel defining a channel inner surface and a sewer aperture leading thereinto, the sewer basket including at least two basket units individually positionable generally adjacent each other in a filtering configuration within the sewer channel for forming a filtering surface extending at least partially across the sewer channel at the selected level;

the basket support including an anchoring section for anchoring the basket support to the channel inner surface and a basket supporting section for allowing the basket units to be abuttingly rested on the basket support, the basket supporting section including an intermediate section, the intermediate section including at least two intermediate segments positionable adjacent each other for allowing the intermediate section to abuttingly support the basket segments in the filtering configuration, the basket supporting section also including an intermediate-anchoring section supporting structure for supporting the intermediate section in a predetermined relationship relative to the anchoring section; whereby when the anchoring section is attached to the channel inner surface the intermediate section is mountable on the intermediate-anchoring section and the basket units are mountable on the intermediate segments in the filtering configuration.

BRIEF DESCRIPTION OF THE DRAWINGS

In the annexed drawings, like reference characters indicate like elements throughout.

FIG. 3 is an end view of the support frame boll and nuts system taken along line 3—3 of FIG. 2 to expand the support frame against the sewer wall and used for the embodiments of FIGS. 2 and 2a;

DETAILED DESCRIPTION OF THE PREFERRED EMBODIMENTS

With reference to the annexed drawings the preferred embodiments of the present invention will be herein described for indicative purpose and by no means as of limitation.

Figure 1:
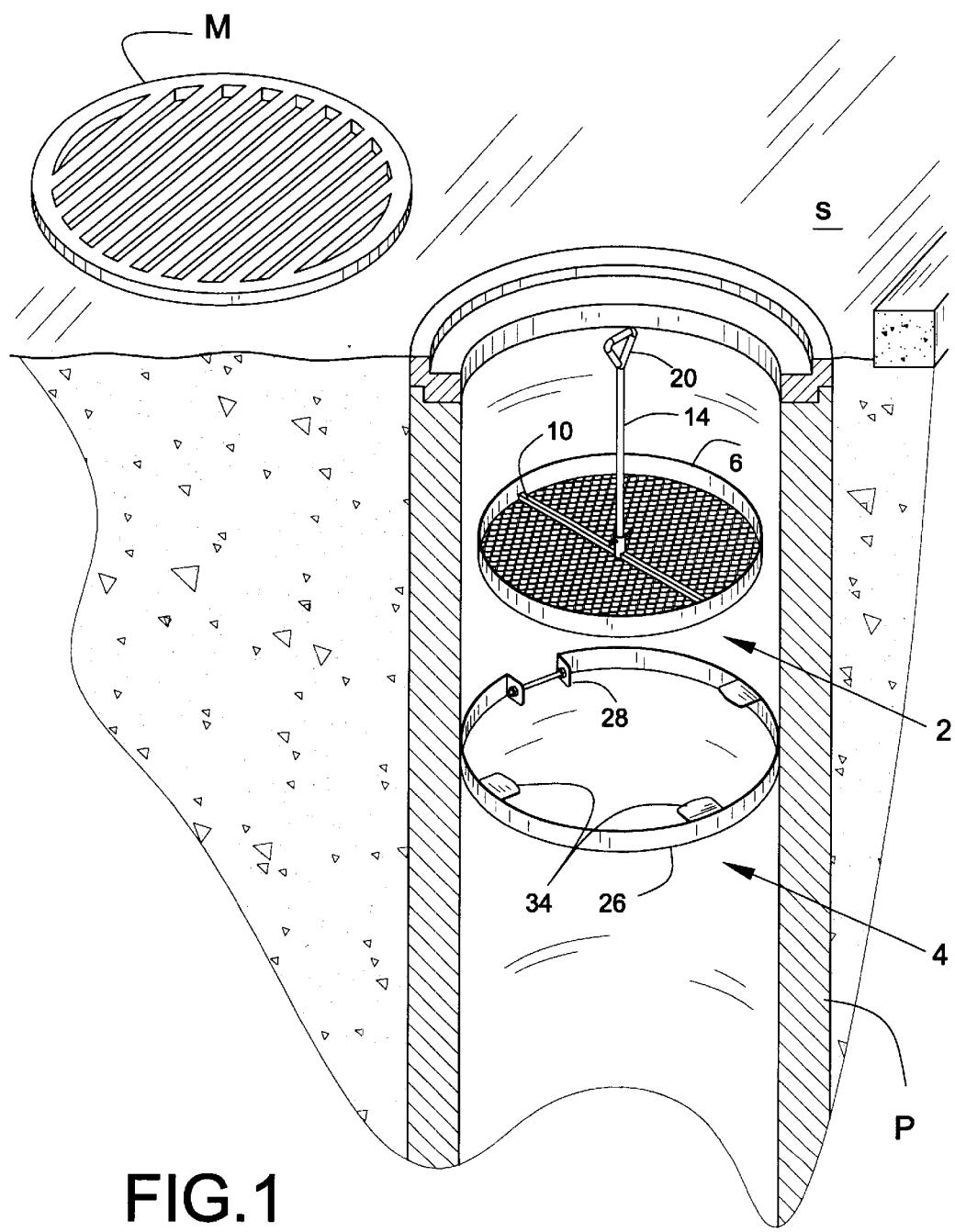
FIG. 1 is a perspective view partly in section of a street with a vertical sewer shown in longitudinal section inside which is shown an exploded perspective view of a first embodiment of the sewer basket of the invention together with the support frame for supporting the sewer basket, and also showing the normal grate or manhole cover to close the top of the sewer.
Figure 4:
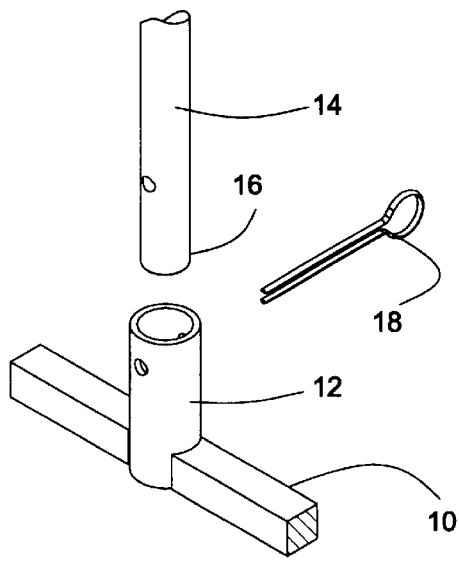
FIG. 4 is a partial perspective view showing one embodiment for connecting the crossbar of the sewer basket with a post having a handle at its upper end.
Figure 4A:
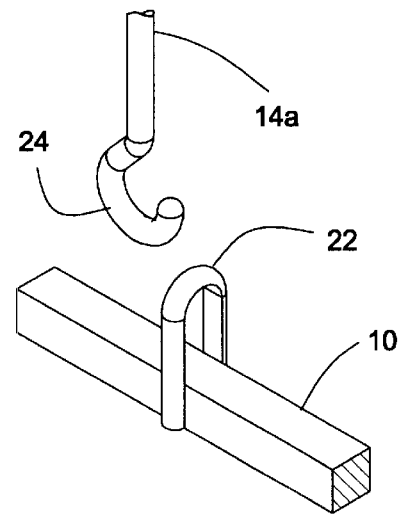
FIG. 4a shows another embodiment of the means for connecting the crossbar of the basket with the handle post.
Figure 5:
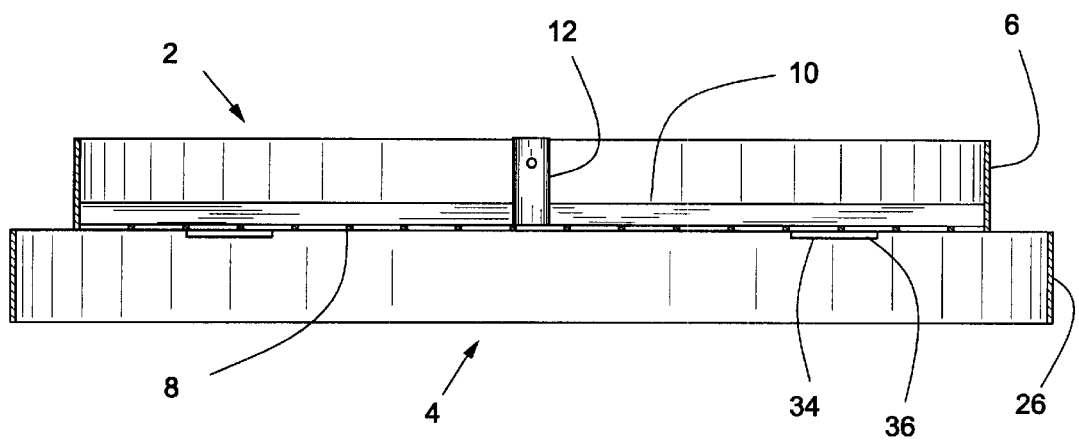
FIG. 5 is a section taken along line 5—5, of FIG. 2.
Figure 5A:
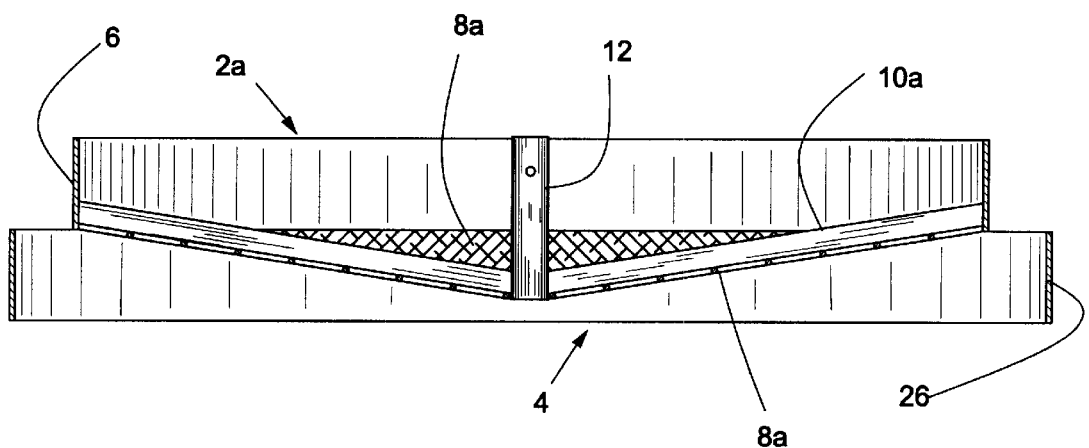
FIG. 5a is an elevation of the assembly of the invention, the basket being modified with respect to FIGS. 1 and 5.

Referring to FIG. 1, there is shown a basket 2 abuttingly supported by a basket support 4 within the upper part of a vertical sewer pipe P or channel which opens at street level and has a channel peripheral wall defining an interior peripheral surface, the street being indicated at S and normally closed by a manhole cover M. The basket 2 includes a basket frame 6 which is circular and formed of a cylindrical flat strip; a filter screen 8 closes the basket frame 6 being secured thereto all around the lower edge thereof. A straight crossbar 10 is secured to the basket frame 6 and extends across the same; the crossbar 10 overlies the filter screen 8 as shown in FIG. 5. The crossbar 10a may be angled at its center as shown at 10a for basket 2a in FIG. 5a. An upright sleeve 12 or 12a is secured to the center of the crossbar 10 or 10a, the sleeve terminating at approximately the top edge of the basket frame 6 or 6a as shown in FIGS. 5 and 5a respectively. A post or rod 14 has its lower end 18 fitted within sleeve 12 or 12a by means of a cotter pin 18 as shown in FIG. 4. As shown in FIG. 4a, sleeve 12 can be replaced by an eye 22 to be releasably engaged by a hook 24 formed at the lower end of post 14a. The top end of the post 14 is formed with a handle 20 which normally extends just underneath the manhole cover, for easy removal of the filled basket and for re-inserting the same in operative position within the sewer pipe P.

Basket support 4 is expandable for supporting the basket 2 at any selected level within the sewer pipe P and this without in any way modifying the interior surface of the sewer pipe. Basket support 4 defines an engagement surface to frictionally engage the channel peripheral wall and includes a biasing component to selectively bias the engagement surface in frictional engagement with the channel peripheral wall. The basket support 4 includes a flat strip 26 that is bent into a circular shape or annular configuration with spaced opposite strip ends each formed by an inturned ear 28 or attachment tongue generally radially and inwardly extending from the strip ends. The strip 26 defines an annulus outer surface being intended to frictionally contact the channel peripheral wall, and an annulus inner surface. The two ears 28 are perforated and a threaded bolt 30 extends therethrough and spans the space between the ears 28 so as to form the biasing component, or a size adjustment component for allowing customization of the size of the diameter of the annular strip 26. Two pairs of nuts 32 are screwed on bolt 30 on each side of the respective ears 28 so as to adjust the spacing between the ears 28 and frictionally lock the latter at the desired adjusted spacing. Therefore the basket support 4 can be first inserted within the sewer pipe P and then expanded by means of the bolt 30 and nuts 32 using standard tools. The support strip 26 is provided with a basket frame engaging ears 34 or abutting tongues which are inwardly folded from top edge 36 of strip 28 so as to extend from the annulus inner surface. The frame 6 of the basket 2 simply abuttingly rests on the ears 34.

Figure 2:
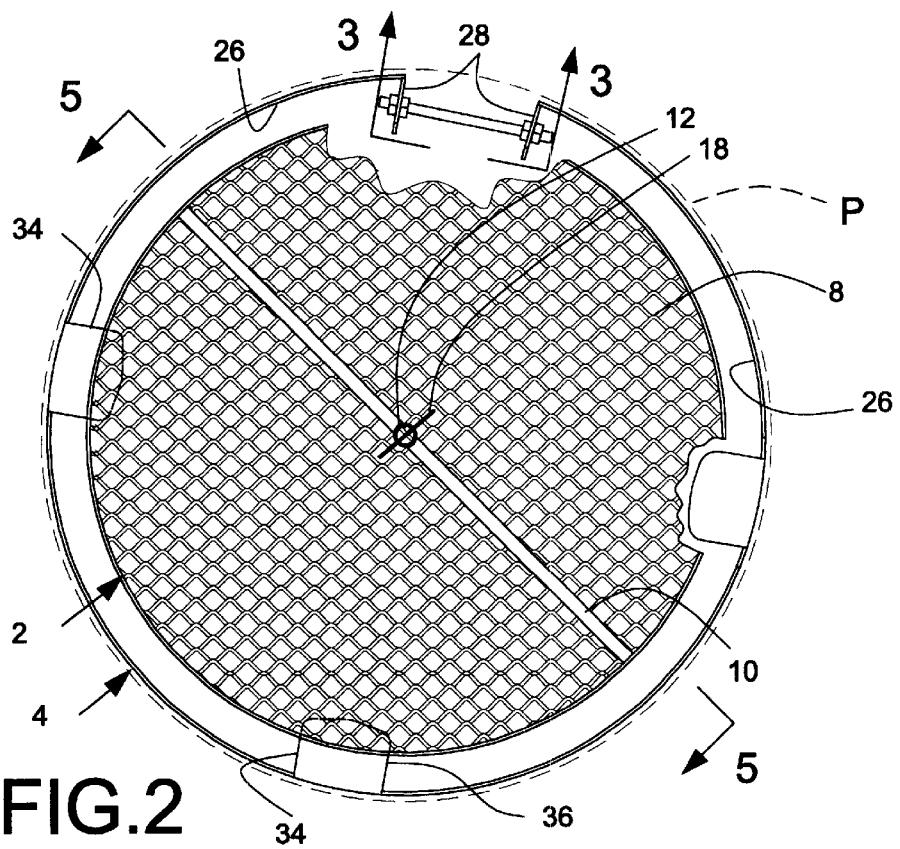
FIG. 2 is a top view of first embodiment of this basket and its support frame.
Figure 2A:
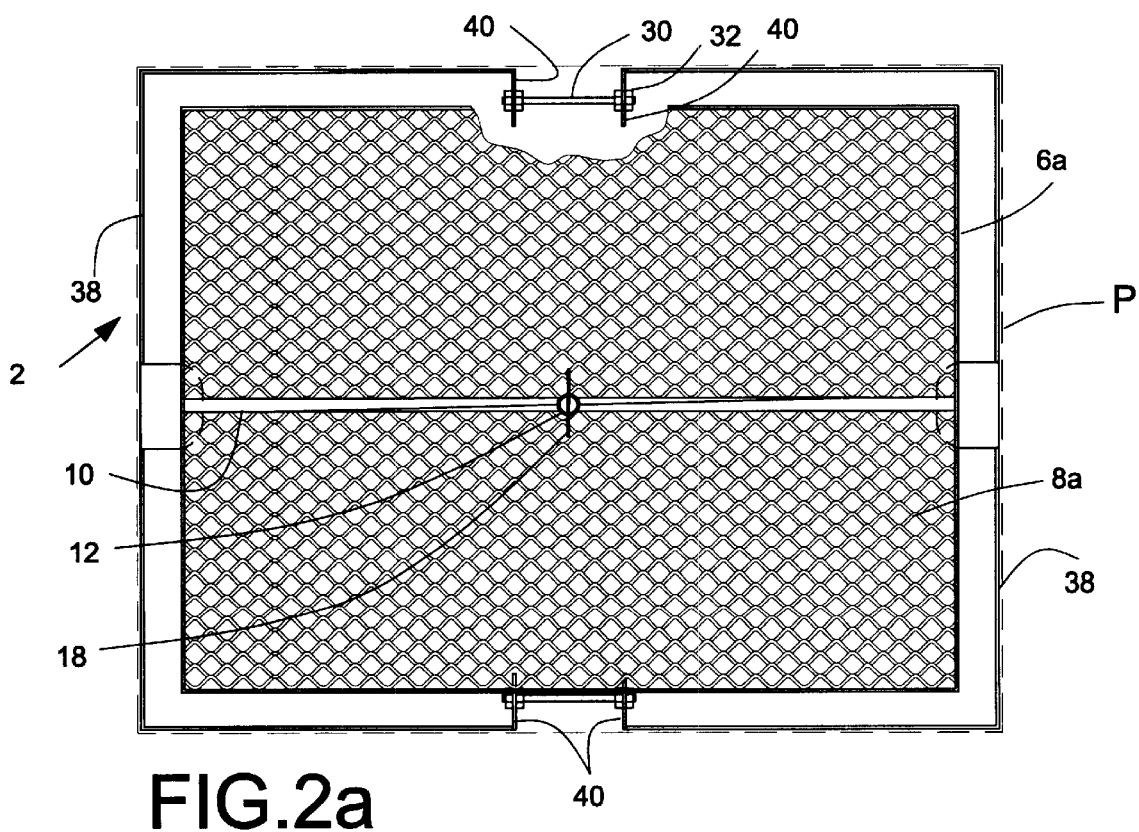
FIG. 2a is a top view of a second embodiment of the assembly of the sewer basket and its support frame to fit a sewer wall of quadrangular shape.

If the sewer pipe P has a quadrilateral cross-section as is often found in sewer pipe manholes, then the basket and its basket support can be shaped to fit the cross-sectional shape of the sewer pipe, as shown in FIG. 2a. There is shown a basket frame 2a of rectangular cross-sectional shape, formed as in the previous embodiment of a rectangular flat strip frame 6a to the under side of which is secured a similarly shaped filter screen 8a which is overlaid by crossbar 10. Here again a post 14 is provided with a handle 20 at its upper end and a lower end adapted to be connected to the center of the crossbar 10 as by the systems of the FIG. 4 or 4a.

The basket support 4a is formed of two U-shaped sections 38, the opposite spaced ends of which are defined by inturned ears 40; each pair of ears is connected by a bolt 30 with nuts 32 to adjust the spacing between each of the two pairs of ears and therefore to expand the basket support and force the same against the sewer pipe interior surface to form a strong support for the basket.

Figure 2B:
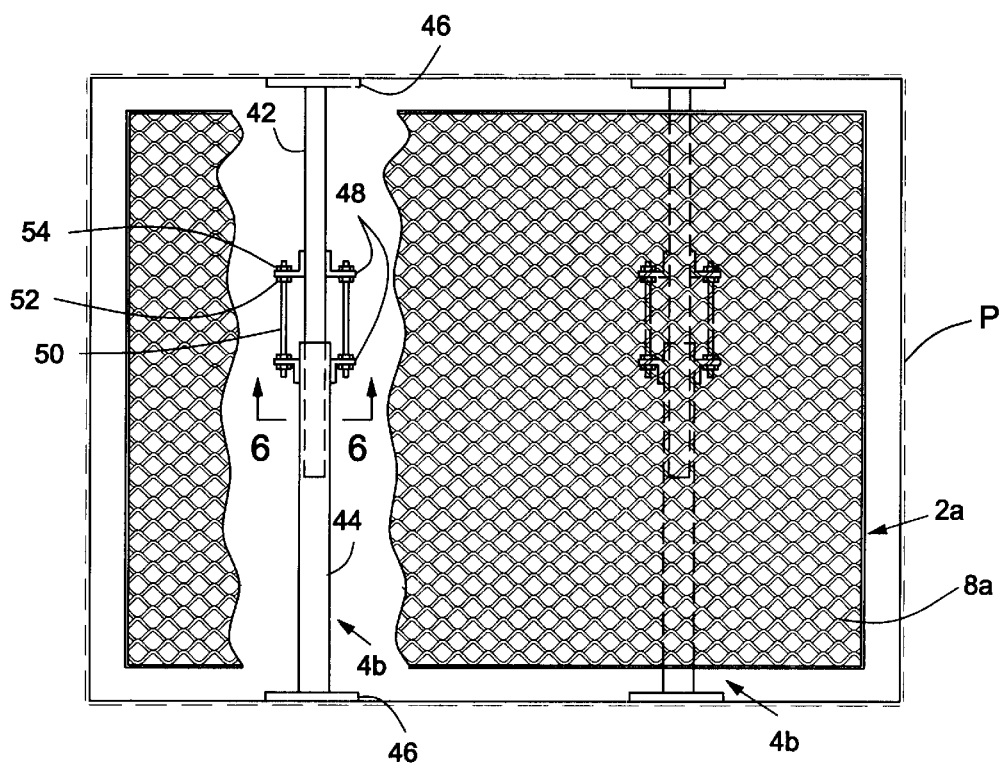
FIG. 2b is a top view of the basket of FIG. 2a but with another embodiment of the support frame.
Figure 3:
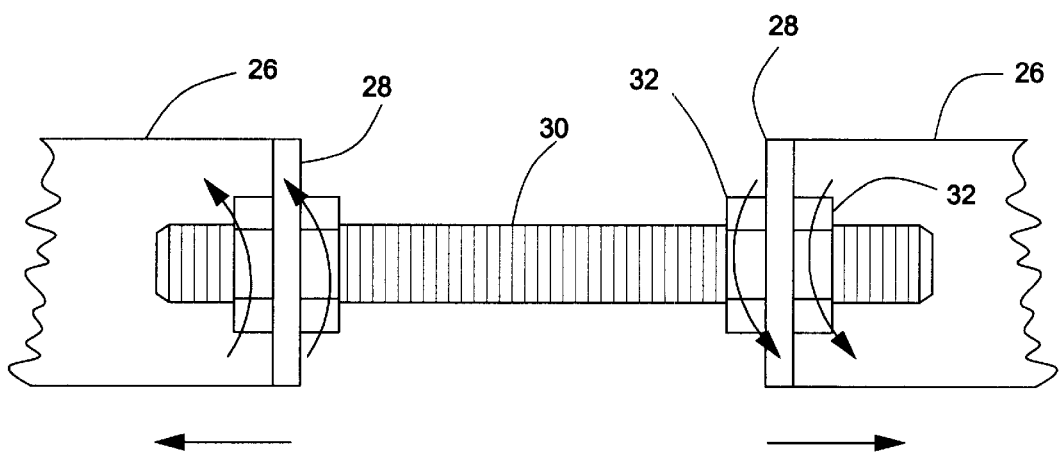
Figure 6:
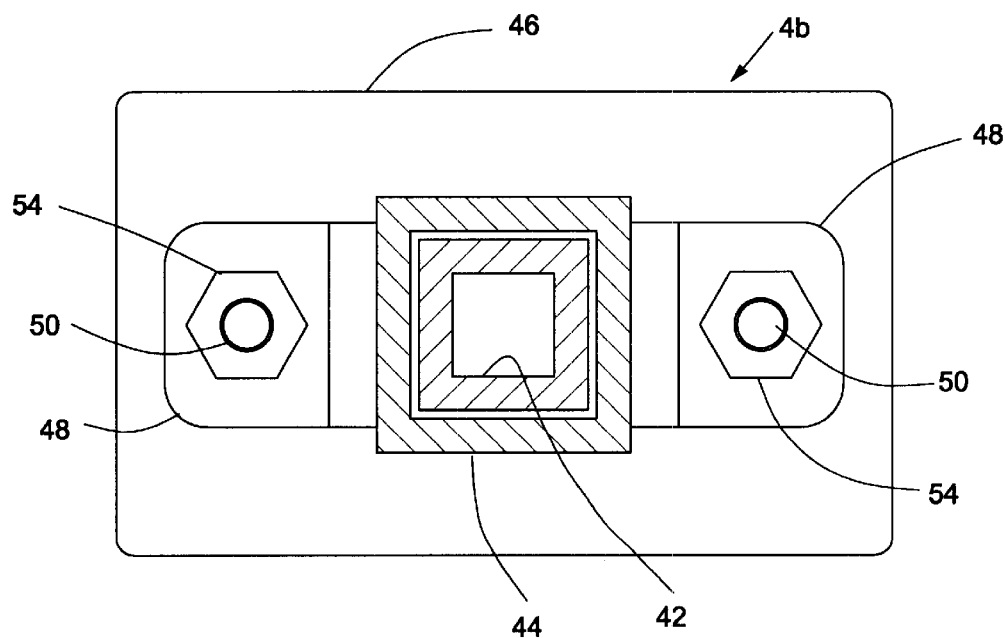
FIG. 6 is a cross-section taken along line 6—6 of FIG. 2b.

FIGS. 2b and 6 show another embodiment of the expandable basket support. This support 4b is shown to support basket 2a of FIG. 2a but could as well support the circular basket 2 of FIG. 2.

Support 4b is a telescopic tube made of an inner tube section 42 fitted within an outer tube section 44. The outer ends of sections 42, 44 carry sewer engaging pads 46. Four ears 48 having a right angle shape are secured in transversely opposite pairs to opposed sides of inner and outer tube sections 42, 44 respectively. The outwardly extending portions of ears 48 have a hole through which extends a bolt 50 on which are screwed two pairs of nuts 52, 54 the inner nuts 52 of each pair on each side of tube sections 42, 44 are screwed to push pads 46 against the sewer pipe walls and outer nuts 54 are then screwed to lock the tube section 42, 44 in adjusted position. Basket 2 or 2a is then simply deposited on support 4b.

Preferably, both the basket 2 and the basket support 4 are entirely either made out of rigid and highly resistant noncorrosive material or protected against corrosion from any suitable protective coating.

Figure 7:
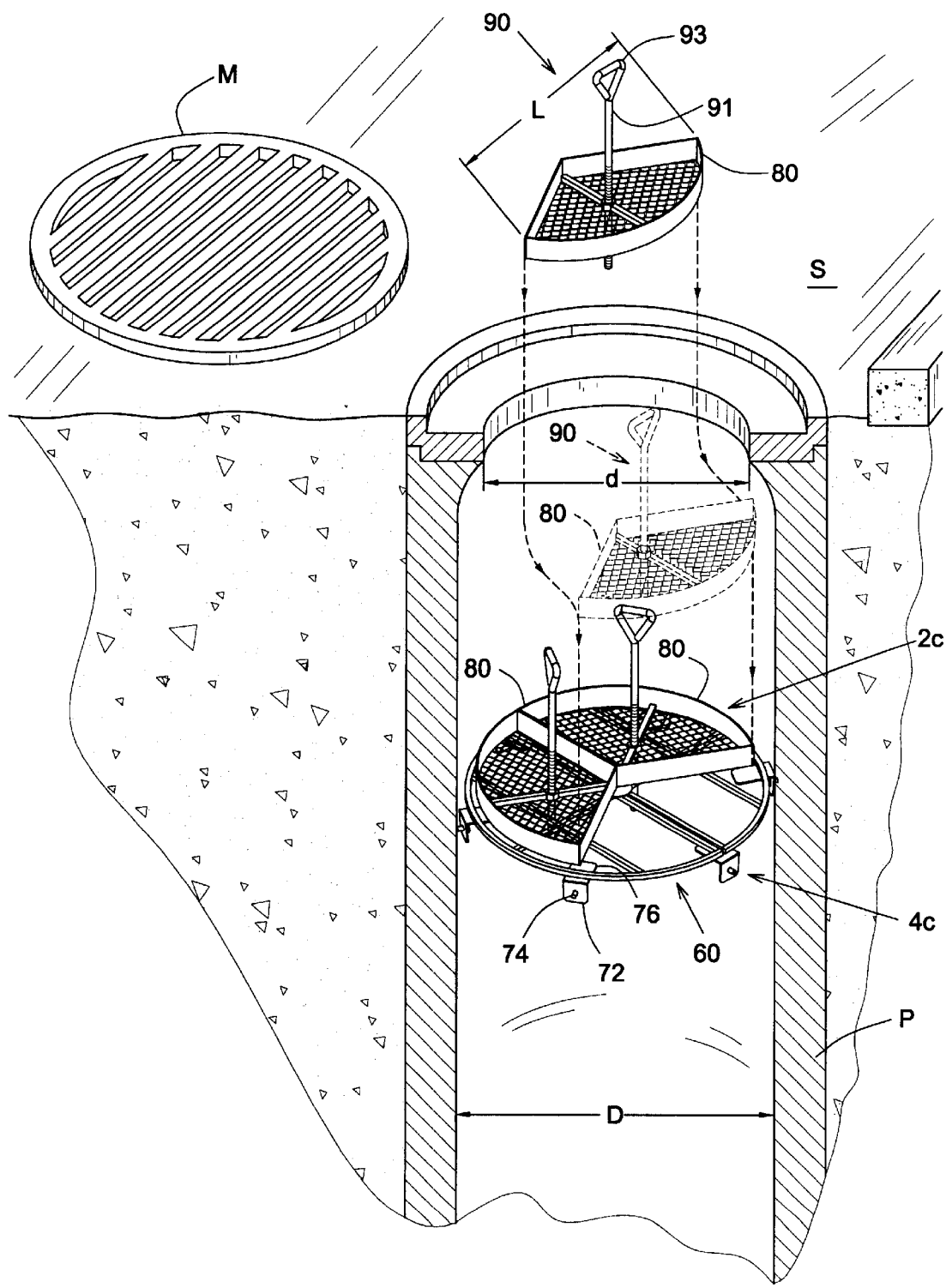
FIG. 7 is a view similar to FIG. 1, showing another embodiment of a basket and support assembly according to the present invention in a sewer pipe having a small opening relative to the cross-section of the vertical pipe, and showing a different basket support anchored to the sewer pipe.

Referring to FIG. 7, there is shown another embodiment of a removable sewer basket 2c or filtering structure including a plurality of, at least two, removable filter units 80 or filtering components preferably releasably supported in a filtering configuration by an intermediate support 60 or supporting structure, itself supported in a supporting configuration by a basket support 4c or anchoring structure at a predetermined level within a vertical sewer pipe P having an opening or aperture at a street level S of a substantially small size relative to its cross-section at the predetermined level. The basket support 4c includes a plurality of, preferably at least three, right angle brackets 26c. Each bracket 26c has a lateral wall 72 or anchoring section to be secured against the interior surface of the sewer pipe P via a fastening device, preferably a concrete type screw 74, at the selected level and a top wall 76 or abutting section to abuttingly support the intermediate support 60 thereon in the supporting configuration.

Figure 8:
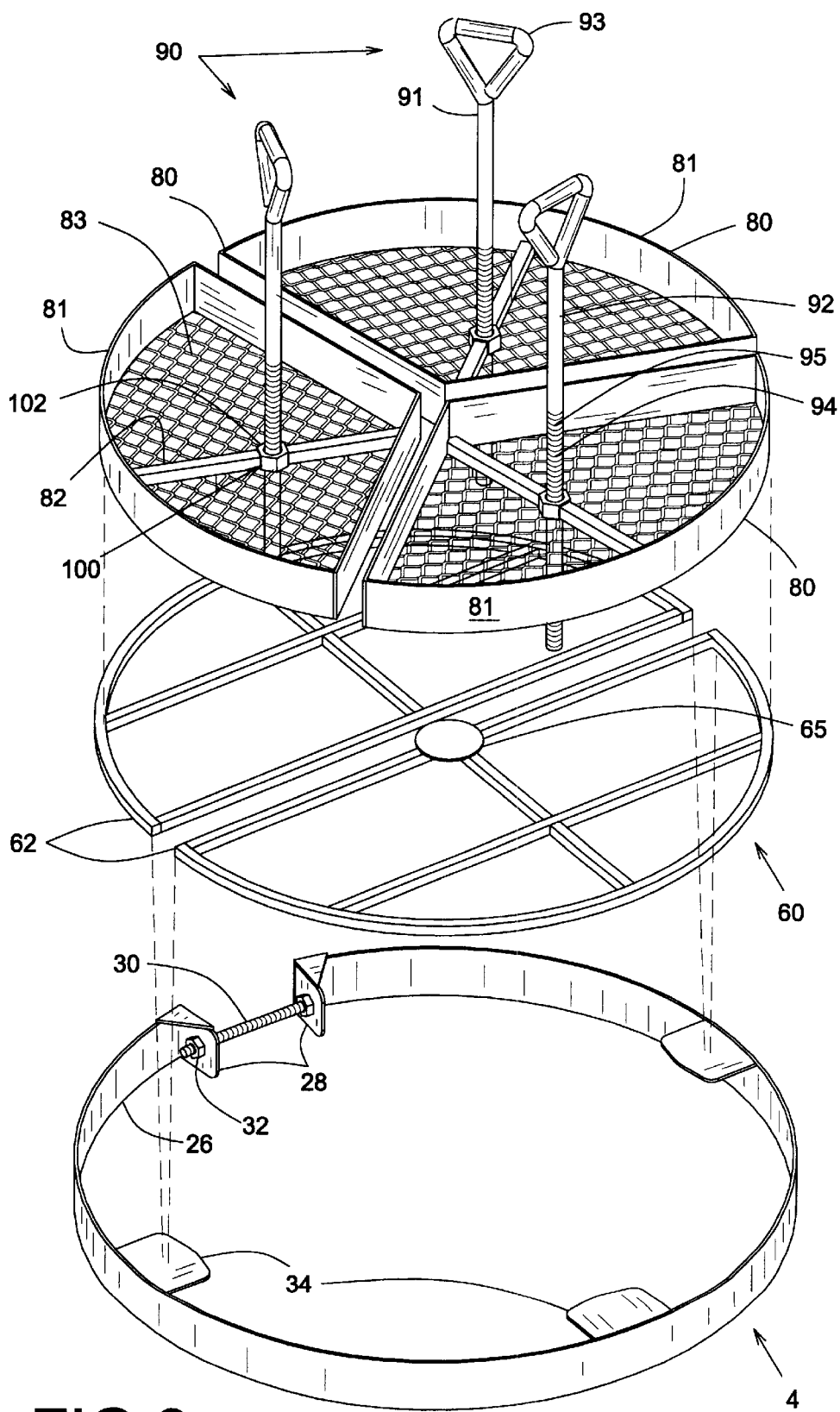
FIG. 8 is an enlarged exploded perspective view of the embodiment of FIG. 7.

The intermediate support 60 has a flat lattice shape, as better shown in FIG. 8. The filter units 80 are adjacent to each other and releasably rest on the intermediate support 60. Each of the filter units 80 has a frame 81 or plate rim, a filter screen 83 or filtering plate secured to and closing the frame 81, and an individual handle device 90 extending therefrom above the unit 80 and accessible from the channel aperture to properly position, place and retrieve the filter unit 80 on and from the intermediate support 60.

The larger overall horizontal dimension of each filter unit 80, namely length L, is obviously smaller than the size, or diameter d, of the aperture of the sewer pipe P to allow for easy retrieval of each of filter unit 80 while being kept in a substantially horizontal orientation to permit collection of the garbage material accumulated therein. Also, having a plurality of filter units 80 is very effective when the sewer pipe P has a relatively large cross-section, in which case a unitary basket, as shown in FIG. 1, would be fairly heavy for an operator to retrieve it by himself.

The frame 81 includes a crossbar 82 secured to opposite sections of the same 81. The handle device 90 includes a post 91 with a handle 93 at the upper end 92. A lower end 94 of Fe post 91 adjustably and releasably attaches to the crossbar 82 via a connecting member 100, or length adjustment component.

The connecting member 100 is preferably substantially located at the center of gravity of the filter unit 80 for easily keeping a horizontal orientation of the same 80 when carried by the handle 93.

As illustrated in FIG. 8, the connecting member 100 is a nut 102 fixedly secured to, preferably welded to, the crossbar 82. The lower end 94 of the post 91 has external threads 95 to releasably and adjustably engage the nut 102, depending on the selected level of the basket support 4 relative to the aperture of the sewer pipe P.

Figure 9:
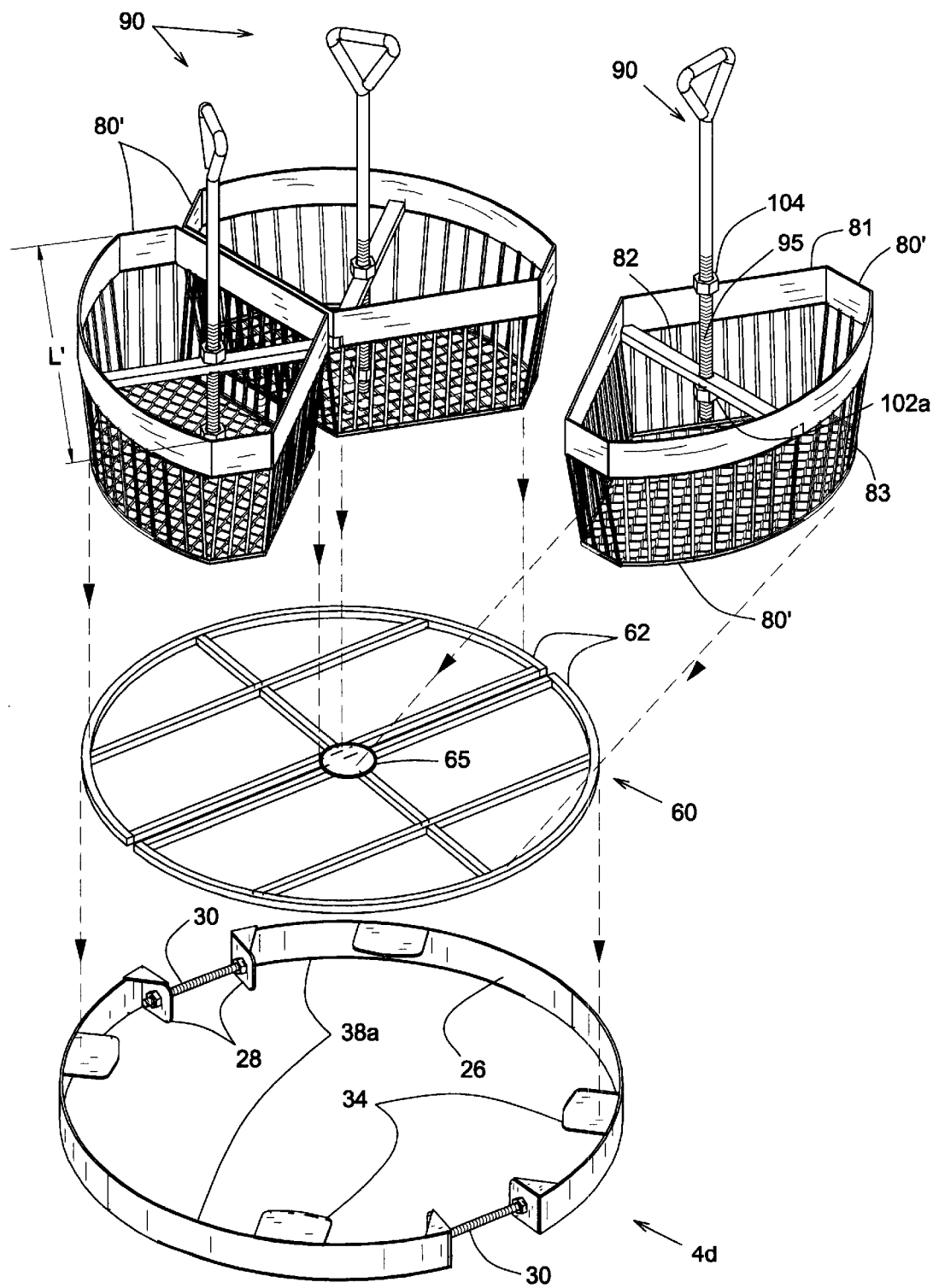
FIG. 9 is a view similar to FIG. 8, showing different filter units.

Alternatively, the crossbar 82 has a through hole 84 slidably (freely) engaged by the post 91. The nut 102a is adjustably and releasably secured to the thread 95 below the through hole 84, as illustrated in FIG. 9. Additionally, an upper nut 104 could engage the thread 95 above the through hole 84 to limit the height of the handle 93 relative to the frame 81 when the filter unit 80' is in rest position, as shown in the two filter units 80' on the left of FIG. 9.

The crossbar 82 is preferably straight and overlies the filter screen 83 or is angled at the center thereof. The central portions of the crossbar 82 and of the filtering means 83 are downwardly recessed relative to their outer portions (similarly to FIG. 5a).

When the size of the channel aperture is relatively small, both the basket support 4d and the intermediate support 60 are preferably made out of at least two adjacent filtering components 38a and supporting parts, segments or components 62 respectively, as illustrated in FIG. 9. The two parts 62 abuttingly rest on the engaging ears 34 of the strip 26 or abutting section of the anchoring structure, or basket support 4d in a safe and stable position. To ensure proper positioning and leveling of the filter units 80' on the parts 62, a common positioning member 65, preferably a small flat linking plate secured to one of the parts 62 and located at the overall center area of the intermediate support 60 overlying and freely abutting on the other part 62, is provided as a common rest surface.

To improve the stability of the filter units 80,80', each part 62 has a flat lattice shape. Each part 62 or supporting component includes a supporting component peripheral rim and a supporting component crossbar extending at least partially across the supporting component rim for at least partially supporting a corresponding filtering component 38a. The supporting component rims are configured and sized to abuttingly rest on the abutting section 34 or engaging ears of the anchoring structure 4,4d. Each supporting component 62 has a generally hemi-disc configuration defining a rim arcuate segment extending integrally into a rim rectilinear segment The rim rectilinear segment of each supporting component 62 is positionable in an adjacent relationship relative to each other so that the supporting components 62 together define a generally disc-shaped configuration of the intermediate or supporting structure 60.

If the filter units 80' are expected to collect a significant amount of garbage material, they could easily have higher lateral walls, preferably being part of the filter screen 83, as shown in FIG. 9. Furthermore, if required, the filter units 80' could be slightly truncated in order to have their overall horizontal dimension L' smaller than the diameter d of the opening to get through the same in a generally horizontal orientation.

Although the present sewer baskets and supports have been described with a certain degree of particularity it is to be understood that the disclosure has been made by way of example only and that the present invention is not limited to the features of the embodiments described and illustrated herein, but includes all variations and modifications within the scope and spirit of the invention as hereinafter claimed.

I claim:

1. A sewer filtering arrangement for preventing solids of a predetermined size from falling into a generally vertical sewer channel while allowing liquids to flow therein, said sewer channel defining a channel aperture leading into said sewer channel and a channel peripheral wall delimiting a peripheral surface of said sewer channel, said filtering arrangement being positionable at a predetermined level across said sewer channel, said filtering arrangement comprising:

at least two filtering components, each of said filtering components having at least one filtering aperture extending therethrough for allowing said liquids to flow therethrough while preventing through passage of said solids of a predetermined size, said filtering components being positionable in a filtering configuration wherein they lie in a generally adjacent relationship to each other to form a filtering structure extending at least partially across a portion of said sewer channel;

at least two supporting components, each of said supporting components allowing the flow of said liquids therethrough, said supporting components being positionable in a supporting configuration wherein they lie in a generally adjacent relationship to each other to form a supporting structure for supporting said filtering components in said filtering configuration;

an anchoring structure for anchoring said filtering arrangement to said peripheral wall, said anchoring structure including an anchoring section for anchoring said anchoring structure within said sewer channel at said predetermined level, said anchoring structure also including an abutting section for abuttingly supporting said supporting components in said supporting configuration.

2. A sewer filtering arrangement as recited in claim 1 wherein said anchoring structure defines an engagement surface for frictionally engaging said channel peripheral wall, said anchoring structure including a biasing component for selectively biasing said engagement surface in frictional engagement with said channel peripheral wall.

3. A sewer filtering arrangement as recited in claim 2 wherein said anchoring structure has a generally annular configuration defining an annulus outer surface and an annulus inner surface, said annulus outer surface being intended to frictionally contact said channel peripheral wall; said annulus inner surface being provided with at least one abutment tongue extending therefrom for abuttingly supporting said supporting components.

4. A sewer filtering arrangement as recited in claim 3 wherein said anchoring structure includes at least two abutment tongues extending in a generally diametrically opposed relationship relative to each other from said annulus inner surface.

5. A sewer filtering arrangement as recited in claim 3 wherein said anchoring structure is formed out of a generally annular shaped supporting strip defining an interrupted generally annular configuration, said supporting strip supporting a pair of generally opposed strip ends, said strip ends being position in a generally facing relationship relative to each other, said supporting structure being provided with a size adjustment component for allowing customization of the size of the diameter of the interrupted annular configuration formed by said supporting strip, said size adjustment component forming said biasing component.

6. A sewer filtering arrangement as recited in claim 5 wherein said supporting strip is provided with a generally radially and inwardly projecting attachment tongue extending from each strip ends; said attachment tongues being mechanically coupled together by said size adjustment component to allow customization of the spacing between said attachment tongues.

7. A sewer filtering arrangement as recited in claim 6 wherein said size adjustment component is a threaded bolt and nut arrangement, said threaded bolt extending through corresponding apertures formed in both said attachment tongues.

8. A sewer filtering arrangement as recited in claim 7 wherein said abutment tongues define an abutment tongue radial spacing therebetween, said size adjustment component maintaining the abutment tongue radial spacing below a predetermined value so as to ensure that said abutment tongues provide sufficient support for supporting said supporting components in said supporting configuration.

9. A sewer filtering arrangement as recited in claim 1 wherein each of said supporting components includes a supporting component peripheral rim and a supporting component crossbar extending at least partially across said supporting component rim for at least partially supporting a corresponding filtering component, said supporting component rims being configured and sized for abuttingly resting on said abutting section of said anchoring structure.

10. A sewer filtering arrangement as recited in claim 9 wherein each of said supporting components has a generally hemi-disc configuration defining a rim arcuate segment extending integrally into a rim rectilinear segment, said rim rectilinear segment of each of said supporting components being positionable in an adjacent relationship relative to each other so that said supporting components together define a generally disc-shaped configuration.

11. A sewer filtering arrangement as recited in claim 10 wherein said supporting structure further includes a linking plate extending from one of said supporting components, said linking plate being configured and sized for abuttingly contacting the other one of said supporting components when said supporting components are in said supporting configuration for stabilizing the supporting structure formed by said supporting components.

12. A sewer filtering arrangement as recited in claim 1 wherein said filtering components are configured and sized so as to form a filtering structure extending within said sewer channel generally thereacross.

13. A sewer filtering arrangement as recited in claim 1 wherein at least one of said filtering components includes a filtering plate provided with a plurality of filtering apertures extend therethrough.

14. A sewer filtering arrangement as recited in claim 13 wherein said filtering plate is provided with a plate rim extending at least partially therefrom.

15. A sewer filtering arrangement as recited in claim 14 wherein at least two adjacent filtering plates are provided with corresponding plate rims and wherein said corresponding plate rims are positionable in abutting contact with each other.

16. A sewer filtering arrangement as recited in claim 1 wherein at least one of said filtering components is provided with a handle extending therefrom.

17. A sewer filtering arrangement as recited in claim 16 wherein said handle is provided with a length adjustment component for allowing adjustment of the length of said handle relative to said filtering component.

18. In combination, a sewer channel with a sewer filtering arrangement for preventing solids of a predetermined size from falling into said sewer channel while allowing liquids to flow therein, said sewer channel having a generally vertical orientation and defining a channel aperture leading into said sewer channel and a channel peripheral wall delimiting a peripheral surface of said sewer channel, said filtering arrangement being positionable at a predetermined level across said sewer channel, said filtering arrangement comprising:

at least two filtering components, each of said filtering components having at least one filtering aperture extending therethrough for allowing said liquids to flow therethrough while preventing through passage of said solids of a predetermined size, said filtering components being positionable in a filtering configuration wherein they lie in a generally adjacent relationship to each other to form a filtering structure extending at least partially across a portion of said sewer channel;

at least two supporting components, each of said supporting components allowing the flow of said liquids therethrough, said supporting components being positionable in a supporting configuration wherein they lie in a generally adjacent relationship to each other to form a supporting structure for supporting said filtering components in said filtering configuration;

an anchoring structure for anchoring said filtering arrangement to said peripheral wall, said anchoring structure including an anchoring section for anchoring said anchoring structure within said sewer channel at said predetermined level, said anchoring structure also including an abutting section for abuttingly supporting said supporting components in said supporting configuration.

19. A combination as recited in claim 18 wherein said channel aperture is smaller than a cross-section of said sewer channel at said predetermined level, each of said filtering components, supporting components and anchoring structure is configured and sized for insertion through said channel aperture when in an unassembled configuration while allowing extension across said sewer channel when in an assembled configuration.

20. The combination of a sewer basket with a basket support for retaining said sewer basket at a selected level within a generally vertical sewer channel, said sewer channel defining a channel inner surface and a sewer aperture leading thereinto, said sewer basket including at least two basket units individually positionable generally adjacent each other in a filtering configuration within said sewer channel for forming a filtering surface extending at least partially across said sewer channel at said selected level;

said basket support including an anchoring section for anchoring said basket support to said channel inner surface and a basket supporting section for allowing said basket units to be abuttingly rested on said basket support, said basket supporting section including an intermediate section, said intermediate section including at least two intermediate segments positonable adjacent each other for allowing said intermediate section to abuttingly support said basket segments in said filtering configuration, said basket supporting section also including an intermediate-to-anchoring section supporting structure for supporting said intermediate section in a predetermined relationship relative to said anchoring section; whereby when said anchoring section is attached to said channel inner surface said intermediate section is mountable on said intermediate-to-anchoring section and said basket units are mountable on said intermediate segments in said filtering configuration.

* * * * *